United States Patent [19]

Bakay

[11] 3,968,199

[45] July 6, 1976

[54] PROCESS FOR MAKING SILANE
[75] Inventor: Carl James Bakay, Marietta, Ohio
[73] Assignee: Union Carbide Corporation, New York, N.Y.
[22] Filed: Feb. 25, 1974
[21] Appl. No.: 445,667

[52] U.S. Cl. .............................. 423/347; 423/341
[51] Int. Cl.² .......................................... C01B 33/04
[58] Field of Search .................... 423/347, 342, 341

[56] References Cited
UNITED STATES PATENTS
3,069,239  10/1962  Winter .............................. 423/342
FOREIGN PATENTS OR APPLICATIONS
2,162,537  7/1972  Germany ........................... 423/347

Primary Examiner—L. Dewayne Rutledge
Assistant Examiner—Michael L. Lewis
Attorney, Agent, or Firm—George A. Skoler

[57] ABSTRACT

There is a process for manufacturing $SiH_4$ by the disproportionation or redistribution of $HSiCl_3$ which comprises feeding $HSiCl_3$ into a bed of insoluble solid anion exchange resin containing tertiary amino or quaternary ammonium groups bonded to carbon therein, refluxing the $HSiCl_3$ to vaporize disproportionated products to the upper portion of the bed and condensing liquid $SiCl_4$ from the area in which $HSiCl_3$ is refluxed, maintaining the temperature at the top of the bed above the boiling point of $SiH_4$ and below the boiling point of $H_3SiCl$, and recovering $SiH_4$ from the bed substantially free of chlorosilanes.

4 Claims, No Drawings

PROCESS FOR MAKING SILANE

This invention is concerned with an improvement on the process described in copending U.S. application Ser. No. 152,587, by Carl J. Litteral, filed on June 14, 1971, commonly assigned. The process described in that application is the disproportionation or redistribution of chlorosilicon hydrides, such as $HSiCl_3$ in contact with an anion-exchange resin containing tertiary amino or quaternary ammonium groups to produce by a multistep process, dichlorosilane, trichlorosilane and silane ($SiH_4$).

Dichlorosilane, monochlorosilane and silane are sparingly employed in commercial activities. Dichlorosilane ($H_2SiCl_2$) is being increasingly used as a source of silicon in the deposition of epitaxial silicon layers in the manufacture of semi-conductor devices. Silane ($SiH_4$) is being used as a source, in a limited number of cases, of silicon metal in the deposition of polycrystalline silicon metal, from which single crystal silicon metal is made, and in making epitaxial silicon layers. Theoretically, silane is a superior source of silicon because the sole products of the decomposition of $SiH_4$ are hydrogen and silicon. In the case of the deposition of silicon from the decomposition of $HSiCl_3$ (the most popular Si Metal source) or $H_2SiCl_2$, the primary by-product is HCl. Hydrogen chloride is a difficult-to-handle material which can react with deposited metal to produce $HSiCl_3$ and/or $SiCl_4$ thereby reducing the efficiency of the reaction and the yield of metal produced. Monochlorosilane is not presently available in quantities sufficient to support commercial activities, but its decomposition also results in the formation of HCl, but in lesser amounts.

It is a purpose of this invention to provide a single step — one pass process for producing silane ($SiH_4$) from one of the most abundant commercial sources of silicon, to wit, trichlorosilane ($HSiCl_3$). The process of this invention involves the disproportionation or redistribution reaction of $HSiCl_3$ in a solid anion exchange resin bed at a temperature sufficient to cause the lower boiling products of the reaction to vaporize from the zone of the reaction and the highest boiling liquid product of the reaction, $SiCl_4$, to be condensed and drained away from the zone of disproportionation. As the lower boiling products are vaporized up the bed of anion exchange resin, the temperature of the bed is progressively lowered to a temperature below the boiling point of trichlorosilane and above the boiling point of silane ($SiH_4$). In this manner, only silane vapors concentrate at the top of the bed while the various chlorosilicon hydrides are continually refluxed within the bed probably in a progressive manner, such as starting with trichlorosilane at about the zone of initial disproportionation, then dichlorosilane above the zone of initial disproportionation followed by monochlorosilane above the zone of dichlorosilane reflux. However, it seems clear that a demarcation of the zones does not exist in the column. At the top of the column, $SiH_4$ is vaporized away.

As a result, the reaction can be characterized as a combination of the following:

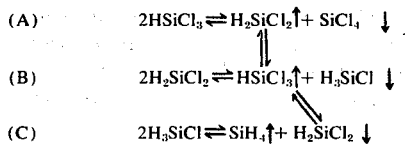

overall reaction is

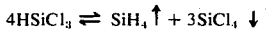

which is driven to the right by the removal of $SiH_4$ vapors from the reaction zone. It is also driven to the right by the removal of $SiCl_4$ (and the other refluent products) from each reaction.

As evident from the discussion herein, a governing physical property in determining the operation of this process is the boiling points of silane (B.P.$-111.9°C$), monochlorosilane (B.P.$-30.4°C$), dichlorosilane (B.P.$8.3°C$), trichlorosilane (B.P.$31.5°c$) and silicon tetrachloride ($57.6°C$).

The process is effected by forming a reflux of $HSiCl_3$ in the anion exchange resin bed at a point spaced from the top of the bed. The temperature of the bed at which $HSiCl_3$ is provided is sufficient to cause vaporization of $HSiCl_3$ and the temperature at the top of the bed is below the boiling point of $H_3SiCl$, and the temperature gradient between those two points is sufficient to form liquid $HSiCl_3$ somewhat above the point where $HSiCl_3$ is provided, vaporous $H_2SiCl_2$ at and/or about the refluent $HSiCl_3$, vaporous $H_3SiCl$ at and/or about the refluent $H_2SiCl_2$, and vaporous $SiH_4$ at and/or about the refluent $H_3SiCl$. However, one may not find significant quantities of refluent $H_2SiCl_2$ and $H_3SiCl$ if the bulk of the bed is at the reflux temperature of $HSiCl_3$.

It follows that if the bed is a short one and vaporous $HSiCl_3$ is fed to its bottom, the means for heat removal will be much greater than when the column is longer. The anion exchange resin bed may be in a column in which the $HSiCl_3$ is fed as a liquid to the top or as a vapor to the bottom. It may be suspended or dissolved in an inert gas or liquid diluent, in the state of a vapor or liquid. It may be injected into the side of the bed, at any level, as a vapor or as a liquid. If the $HSiCl_3$ is added to the bed as a liquid, then the bed must be externally or internally heated to effect vaporization. In any event, the bed will require cooling to effect the desired separation of refluent disproportionated product from the advancing vapor.

Since $SiCl_4$, per se, can no longer be disproportionated to enhance the production of hydride products, there is no economic basis for providing a bed in which $SiCl_4$ can dwell. It therefore follows that $H_2SiCl_2$ vapor is most effectively provided at the bottom of a bed whose size is determined by the repeated disproportionation reactions (A) through (C) above.

The amino ion exchange resins suitable for use in the practice of this invention are polymeric materials which are insoluble in silane, monochlorosilane, dichlorosilane, trichlorosilane, and silicon tetrachloride.

Such insolubility can be achieved, in the case of linear, thermoplastic ion exchange resins, by using a resin of sufficiently high molecular weight, viz. greater than about 10,000 such that the polymers possess the requisite insolubility. Insolubility can be achieved by employing a cross-linked ion exchange resin, such as one which is infusible as well. However, for the purposes of this invention, the degree of cross-linking need only be sufficient to meet the requisite insolubility requirements.

The amino functionality in the resin is preferably a tertiary amino or quaternary ammonium group attached through carbon to the resin structure. Preferably, other than the nitrogen atoms or the halide ions of the amino functionality, all of the resin is composed of carbon and hydrogen. However, this limitation does not exclude the presence of impurities in the resin which contain other atoms such as oxygen, phosphorus, iron, boron and the like. During the course of the reaction, it is believed that such impurities are leached to a substantial degree from the resin by passage of chlorosilicon hydride monomer through the resin thereby to produce a resin free of such impurities or the resin retains such impurities without contaminating the feed or reaction products.

Particularly preferred ion exchange resins are those made from the copolymerization of a monoolefinically unsaturated (halogenated or non-halogenated) hydrocarbons or a monoolefinically unsaturated heteroamine and a polyolefinically unsaturated hydrocarbon or polyolefinically unsaturated heteroamine. Illustrative of such monoolefinically unsaturated compounds are, for example, styrene, 4-chlorostyrene, 3-chlorostyrene, vinyltoluene, 4-chloromethylstyreme, vinylnaphthalene, vinylpyridine, 2-methyl-5-vinyl-pyridine, 2,3-dimethyl-5vinylpyridine, 2-methyl-3-ethyl-5-vinylpyridine, 2-methyl-5-vinylquinoline, 4-methyl-4-vinylquinoline, 1-methyl- or 3-methyl-5-vinylisoquinoline, and the like.

The polyolefinically unsaturated compounds may be, for example, one of the following: 1,4-divinylbenzene, divinylpyridine, divinyltoluenes, divinylnaphthalenes, trivinylbenzene, trivinylnaphthalenes, and the polyvinylanthracenes.

Such copolymers are well known and a number of them are commercial products which possess amino functionality. They may be converted into cross-linked resins with conventional free radical addition catalysts such as peroxides. If the monomers employed contain tertiary amino groups, such as is the case with the pyridinyl compounds mentioned above, then it is not necessary to treat the copolymer to introduce the amino functionality. However, if the copolymer contains chloro groups (and is free of amine) then the amine can be formed by reacting the copolymer with, for example, ammonia, primary and secondary alkyl and/or aryl amines, to form the amine by condensation, where the by-product is HCl. In the preferred practice of this invention, the amine formed in this manner is the reaction product of a secondary amine, such as a dialkylamine, a diarylamine and/or an alkylarylamine, and the chlorinated resin.

Quaternization of the tertiary amine containing resin can be effected by reaction with a hydrocarbon halide such as an alkyl halide or aryl halide, to form the corresponding quaternary amine halide.

Amine anion exchange resins are available generally in two forms. One form is called a gel type resin and represents the standard type exchangers. The other form is called a macroreticular type anion exchange resin. The latter form possesses, within the particles, greater porosity for the passage of molecules. The gel type resins possess collapsed gel structures whereas the macroreticular resins possess a non-gel pore structure that is not collapsed. Such forms of the resins have been thoroughly described in the published literature, see, for example, JACS, vol. 84, Jan. 20, 1962 at pages 305 and 306; *I & EC Product Research and Development*, vol. 1, No. 2, June 1962, at pages 140–144; *Polymer Letters* (1964) vol. 2, at pages 587–591; U.S. Pat. No. 3,037,052, patented May 29, 1962; and U.S. Pat. No. 3,367,889, patented Feb. 6, 1968. The later patent is particularly pertinent with respect to the processes for producing a macroreticular tertiary amine ion exchange resin, see specifically Example IV therein.

Illustrative of a commercial macroreticular tertiary amine ion exchange resin is Amberlyst A-21, a trademark owned by, and which resin is produced by, Rohm and Haas Company, Philadelphia, Pa. It has the following physical properties:

| | |
|---|---|
| Appearance | Hard, spherical, light tan Water-saturated beads |
| Ionic form | Free base |
| Moisture holding capacity, percent | 45 to 53 |
| Exchange capacity: | |
| Weight capacity, meq./g. dry resin | 4.7 to 5.0 |
| Volume capacity, meq./ml. | 1.5 to 1.7 |
| Density, lbs./cu. ft. | 38 to 42 |
| Effective size, mm. | 0.40 to 0.55 |
| Uniformity coefficient | 2.0 maximum |
| Fines, by wet sieve analysis through No. 50 sieve, percent | 1.0 maximum |
| Hydraulic expansion, free base form at 2.0 gpm/cu. ft., 30°C, percent | 120 maximum |
| Whole bead content, percent | 100 |
| Porosity, percent | 35 to 45 |
| Average pore diameter A | 700 to 1200 |
| Surface area, m/g. | 20 to 30 |
| Solids percent | 47 to 55 |
| Percent swelling from dry state to solvent-saturated state- | |
| Hexane | 20 |
| Toluene | 25 |
| Diethylether | 22 |
| Acetone | 22 |
| Absolute ethanol | 30 |
| Water | 25 |

These data were obtained using free base form resin previously conditioned for irreversible swelling by a two cycle alternate acid-caustic rinse treatment. Such swelling may amount to 10 to 15 percent.

Illustrative of a commercial macroreticular quaternary amine ion exchange resin is Amberlyst A-26 a trademark owned by, and which resin is produced by, Rohm and Haas Company, Philadelphia, Pa. It has the following physical properties:

| | |
|---|---|
| Appearance | Hard, spherical, light tan, water-saturated beads |
| Functional group | Quaternary Ammonium |
| Ionic form | Chloride |
| Moisture holding capacity, % | 61–65 |
| Ion exchange capacity: | |
| Weight capacity, meq./g | 4.1–4.4 |
| Weight capacity, meq./ml. | 0.95–1.1 |
| Density, lbs/ft.$^3$ | 39–43 |
| Effective size, mm. | 0.45–0.55 |
| Uniformity coefficient | 1.8 maximum |
| Whole bead content, % | 100 |
| Average pore diameter A | 400–700 |
| Surface area, m$^2$/g. | 25–30 |

Illustrative of a commercial gel type quaternary ammonium ion exchange resin is Amberlite IRA-400, a trademark owned by, and which resin is produced by, Rohm and Haas Company, Philadelphia, Pa. It has the following physical properties:

| | |
|---|---|
| Appearance | Hard, spherical, dark tan water saturated beads |
| Ionic form | Quaternary amine hydrochloride |
| Moisture Holding | |

-continued

| | |
|---|---|
| Capacity, % | 42–48 |
| Exchange Capacity | |
| Wt. Capacity, meq./g. dry resin | 3.8 |
| Volume Capacity, meq./ml. | 1.4 |
| Density, lbs/cu. ft. | 38.0–45 |
| Effective size, mm | 0.38–0.45 |
| Uniformity Coefficient | 1.75 (max.) |
| Fines, by wet sieve analysis through No. 50 sieve (U.S. Standard), percent | <2.0 (max.) |
| Whole bead content, percent | 100 |
| mean pore diameter, Angstroms | none |
| Swelling, conversion from chloride to hydroxide form, % | 18–22 |

The aforementioned resins are predicated upon styrene and divinylbenzene copolymers which are chloromethylated on the styrene ring followed by amination to produce the desired amine exchange functionality. Further alkylation as described above can be employed to produce the corresponding quaternary ammonium derivatives.

In the most desirable practice of this invention, the tertiary amine or quaternary ammonium groups are dialkyl amino, or alkyl phenyl or diphenyl or dicycloalkyl or alkylcycloalkyl, or further alkylated derivatives of the above to the quaternary derivative, where each alkyl contains one to about 18 carbon atoms and the cycloalkyl contains about 4 to about 8 carbon atoms. The most preferred tertiary amino or quaternary ammonium functional groups are those which are the alkylamino or alkylammonium wherein each alkyl thereof contains one to about 8 carbon atoms.

The above described resins are particulate and in this form can be employed to disproportionate the $HSiCl_3$ feed by passing liquid or vapors of $HSiCl_3$ through a bed of such particles.

The disproportionation process may be practiced at temperatures as low as about 0°C. to as high as about 350°C., though the preferred operating temperatures are typically about 20°C. to about 200°C.

The process of this invention, as characterized above, can be carried out as a liquid phase process or as a vapor phase process. Surprisingly, the maximum equilibrium that one can achieve by such disproportionation reactions is attained more rapidly in a vapor phase disproportionation reaction as compared to a liquid phase reaction. Hence, for commercial utilization of this process, a vapor phase reaction will probably be preferred.

The process may be carried out under subatmospheric, atmospheric or superatmospheric pressure. Pressure plays a practical role in the utilization of this process as a mechanism for controlling the state of the feed material and disproportionation products during conduct of the reaction. It is not, however, a critical factor to the operability of this process. For example, if one wishes to operate the process at 60°C. at the initial reflux in the liquid phase rather than the vapor or gas phase, certain considerations must be made. For example, at 60°C., silane, monochlorosilane, trichlorosilane, dichlorosilane, and silicon tetrachloride are vaporized at atmospheric pressure and therefore pressure must be applied in order to maintain a liquid phase process in which these materials are present. However, the term "liquid phase process" does not mean that all of the products of the disproportionation reaction and the monomer feed are in the liquid phase. All that is necessary for a liquid phase reaction is that at least one of such products be liquid under conditions of operation.

Another element of the process is the "contact time" or rather the "residence time" between the resin and the feed materials. For each temperature employed, there is an independent period of time in which such monomer feed should be in contact with the anion exchange resin to reach ultimate equilibrium. The mole per cent of the desired or favored disproportionated product is dependent upon the process temperature, where higher temperatures generally yield higher mole per cent quantities of such product, and the contact time. However, if it is desired to achieve partial disproportionation and, hence, achieve less than the equilibrium of such disproportionation, then a shorter contact time will be favored.

EXAMPLE

A 24 by 1-½ I.D. vacuum-jacketted distillation column was packed with a mixture of ⅛ borosilicate glass helices and 13 g of anhydrous Amberlyst A-21 resin (sieved to >24 mesh), supplied as a toluene slurry. The resin was dried overnight in place by an nitrogen stream. The packed column was inserted onto a 1000 ml, round bottom, 3-neck flask fitted with a 0–52°C ASTM thermometer and nitrogen purge, and topped with a Dry-Ice-acetone condenser. Standard taper joints were fitted with Teflon sleeves wherever possible. The outlet of the condenser was connected to the product outlet line consisting of, in sequence, a mercury manometer, septum sampling T, a 33.1 grams active carbon trap (Columbia grade LCK, 12/28 mesh) at room temperature, a post-trap septum sampling T, ending in a nitrogen blow-by.

Next, 820 g of 99.9% pure trichlorosilane were added to the flask along with boiling ceramic chips, and the apparatus purged with nitrogen for an hour. With the purge off, the column was brought to reflux, and kept just below flooding condition for the entire run. Silane rate of production was monitored by clamping off the exit line, downstream of the carbon trap, withdrawing 10 cc vapor via syringe, and recording the time needed for the manometer to return to 0 mm pressure (2 to 2½ minutes).

Pre- and post-trap gas samples were taken periodically with a 2½ cc disposable glass syringe, and injected immediately into an F&M 700 gas chromatograph fitted with a 15 × ¼ SE-30 on Chromosorb W 80/100 column, held isothermally at −10° ± 5°C. This was adequate to separate $N_2$. $SiH_4$, $H_3SiCl$ and $H_2SiCl_2$ with higher boiling monomers being retained on the column.

It was found that if the active carbon trap was cooled to −72°C, no $SiH_4$ passed it. After 10 hours it was warmed to room temperature (25°C), and this allowed $SiH_4$ to pass, retaining any chlorosilanes.

The apparatus was run for 68 hours over 9 days with 9 shutdowns to a pot composition of 76% $SiCl_4$, 22% $HSiCl_3$ and 1% $H_2SiCl_2$. No leaks or equipment failures were encountered.

The results of the runs discussed above are set forth in the following table:

TABLE

| Time (Hrs.) | Silane (Liters)* | Carbon Trap Temp. | Product Gas Comp. (Mole %) | | | |
|---|---|---|---|---|---|---|
| | | | Before Carbon Trap | | After Carbon Trap | |
| | | | SiH$_4$ | H$_3$SiCl | SiH$_4$ | H$_3$SiCl |
| 1 | 0.3 | −80°C | 96.3 | 3.7 | | |
| 2 | 0.6 | −80°C | 96.2 | 3.8 | | |
| 3 | 0.9 | −80°C | 97.2 | 2.8 | Pure N$_2$ (warm trap) | |
| 4 | 1.2 | −24°C | 97.6 | 2.4 | | |
| 5 | 1.5 | −21°C | 97.9 | 2.1 | Pure N$_2$ | |
| 6 | 1.8 | −21°C | 98.1 | 1.9 | | |
| 8 | 2.4 | −21°C | 98.4 | 1.6 | Pure N$_2$ (warm trap) | |
| 10 | 3.0 | 0 | 98.4 | 1.6 | | |
| 23 | 7.0 | 22°C | 97.7 | 2.3 | 99.9 | 0.1 |
| 24 | 7.3 | 22°C | 97.7 | 2.3 | 99.5 | 0.5 |
| 31 | 9.4 | 22°C | 97.8 | 2.0 | 99.8 | N.D. & 0.2 hvs. |
| 67 | 20.0 | 22°C | 97.7 | 2.3 | 99.0 | 0.3 & 0.7 hvs. |
| 68 | 20.3 | 22°C | | | Shutdown | |

*Based on an average of 300 cc/hour measured production rate.

What is claimed is:

1. The process of producing SiH$_4$ which comprises providing HSiCl$_3$ in a bed of an insoluble, solid anion exchange resin congtaining tertiary amino or quaternary ammonium groups bonded to carbon thereof, maintaining the temperature of the bed where HSiCl$_3$ is provided sufficient to cause said HSiCl$_3$ to be disproportionated to form vaporous products which rise in the bed, and SiCl$_4$, which is condensed, maintaining the temperature at the top of the bed above the boiling point of SiH$_4$ and below the boiling point of H$_3$SiCl and recovering SiH$_4$ which is substantially free of chlorosilicon hydrides from the bed.

2. The process of claim 1 wherein the resin is macroreticular and contains tertiary amino groups.

3. The process of claim 2 wherein the resin is derived from the reaction of a styrene and divinylbenzene.

4. The process of claim 1 wherein liquid HSiCl$_3$ is vaporized and the vapors are passed to said bed.

* * * * *

UNITED STATES PATENT OFFICE
CERTIFICATE OF CORRECTION

Patent No. 3,968,199      Dated July 6, 1976

Inventor(s) Carl James Bakay

It is certified that error appears in the above-identified patent and that said Letters Patent are hereby corrected as shown below:

Column 6, line 23, "24 by 1-1/2" should read -- 24" by 1-1/2"--.

Column 6, line 24, "1/8" should read -- 1/8" --.

Column 6, line 54, "15 x 1/4" should read -- 15' x 1/4" --.

Signed and Sealed this

Nineteenth Day of October 1976

[SEAL]

Attest:

RUTH C. MASON
Attesting Officer

C. MARSHALL DANN
Commissioner of Patents and Trademarks